June 5, 1951          J. A. MEAD          2,556,097

SEARCHING CAGE ERECTION SYSTEM FOR GYROSCOPES

Filed Sept. 8, 1949          2 Sheets-Sheet 1

INVENTOR.
JOHN A. MEAD
BY Henry L. Shenier
ATTORNEY

June 5, 1951  J. A. MEAD  2,556,097

SEARCHING CAGE ERECTION SYSTEM FOR GYROSCOPES

Filed Sept. 8, 1949  2 Sheets-Sheet 2

INVENTOR.
JOHN A. MEAD
BY
Henry L. Shenier
ATTORNEY

Patented June 5, 1951

2,556,097

UNITED STATES PATENT OFFICE 2,556,097

SEARCHING CAGE ERECTION SYSTEM FOR GYROSCOPES

John A. Mead, Croton-on-Hudson, N. Y., assignor to The Norden Laboratories Corporation, New York, N. Y., a corporation of Connecticut Application September 8, 1949, Serial No. 114,641

11 Claims. (Cl. 74—5.44)

My invention relates to a searching cage erection system for gyroscopes and more particularly to an improved erection system for use in flight gyroscopes for automatic pilots and other gyroscopic instruments in which weight and space are of prime consideration.

The use of a rolling ball for an erection system is known to the art. In the prior art systems, however, the erecting torque was derived from the weight of the ball itself, and there was no control over the point at which the torque was applied relative to the direction of tilt. This condition produced an erecting path over the locus of a spiral extending in the clockwise direction, and attempts were made to compensate for the spiral by introducing a degree of pendulocity. This in turn precluded balancing the gyroscope with the result that if during periods when it was attempted to render the erecting system inoperative, as for example during turns, excessive drift would be introduced.

One object of my invention is to provide a sensing ball erecting system permitting straight line erection of a gyroscope which is balanced.

Another object of my invention is to provide a searching cage erection system for gyroscopes employing a rolling ball as the sensing member in which a balanced gyroscope is employed so that a minimum of error will be introduced during turns when the erecting system is automatically rendered inoperative.

Another object of my invention is to provide a searching cage erection system for gyroscopes employing a rolling ball as the sensing member, in which the point at which the torque is to be applied for erection precession is predetermined, the ball sensing the direction in which the tilt axis departs from vertical.

Another object of my invention is to provide an erecting system for a non-pendulous gyroscope in which the erecting system is automatically rendered ineffective during turns.

Other and further objects of my invention will appear from the following description.

In general my invention contemplates the provision of a magnetic drag cup provided with a plurality of cams adapted to step about a member carrying a plurality of pins and an eccentrically positioned erecting weight. When the gyroscope is in erect position the member is stepped about at a substantially uniform speed so that the integral of the erecting moments around the circumference of the path of travel will produce an erecting moment of zero. When, however, the gyroscope spin axis departs from the vertical position, means are provided for causing the erecting weight to dwell in a position applying an erecting torque. A rolling ball is used to control the period of dwell and the direction of application of the torque. The arrangement is such that during turns the ball is thrown to a position in which the eccentric weight will not dwell, thus eliminating the erecting moment during these periods automatically.

In the accompanying drawings which form part of the instant specification and which are to be read in conjunction therewith, and in which like reference numerals are used to indicate like parts in the various views.

Figure 1:
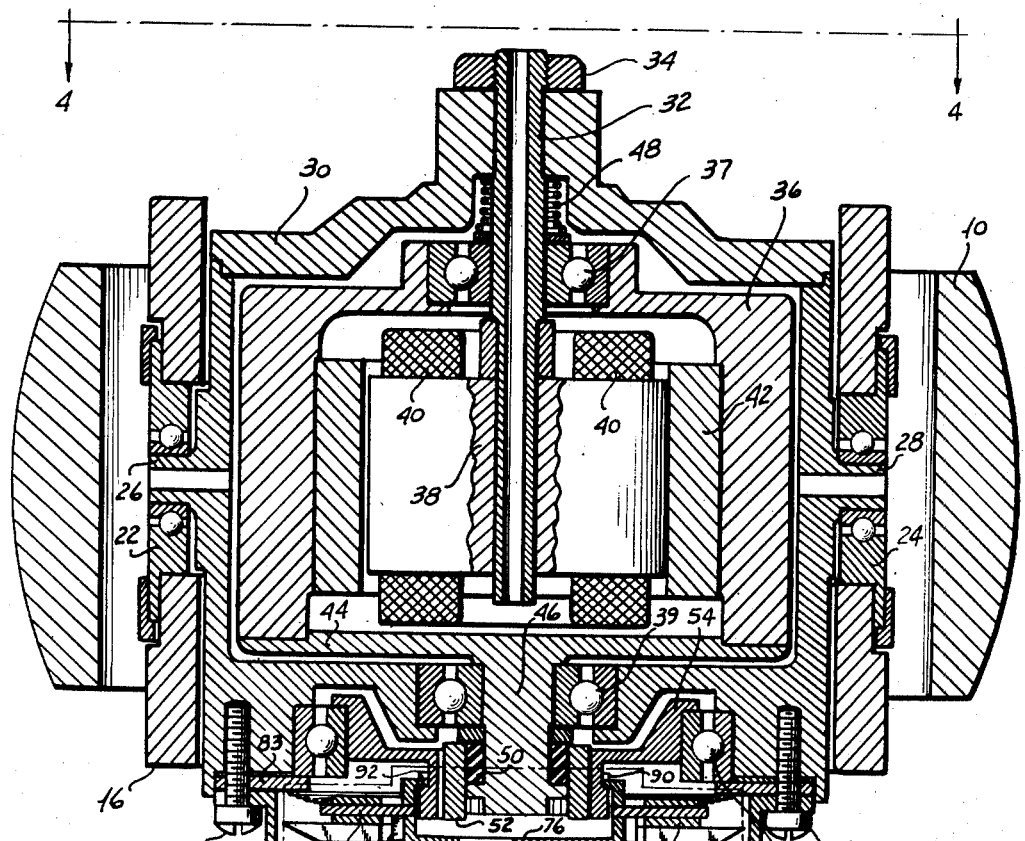
Figure 1 is a sectional elevation of a gyroscope containing a searching cage erecting system according to one embodiment of my invention.
Figure 4:
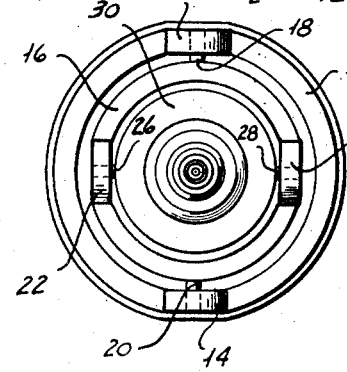
Figure 4 is a plan view drawn on a small scale taken along the line 4—4 of Figure 1.

More particularly referring now to the drawings, an outer ring 10 is mounted in any suitable support, as for example, in the flight gyroscope housing of an airplane. The ring 10 carries a pair of bearings 12 and 14 (shown in Figure 4) in which is pivotally mounted an inner gimbal ring 16 formed with a pair of trunnions 18 and 20 rotatably carried by the bearings 12 and 14 so that the gimbal ring 16 may rotate about a fore-and-aft axis. The inner gimbal ring 16 carries a pair of bearings 22 and 24 in which trunnions 26 and 28 are pivotally mounted for rotation about an axis at right angles to the axis of trunnions 18 and 20. This axis may be designated as the transverse axis. It is to be understood, of course, that the bearings 12, 14, 22 and 24 may be of any suitable construction. As will be seen by reference to Figure 1, I have shown ball bearings. The trunnions 26 and 28 are formed integrally with a gyroscope housing indicated by the reference numeral 30. The gyroscope housing carries a shaft 32 which is rigidly secured thereto by means of a nut 34. The gyroscope rotor 36 is mounted upon a pair of ball bearings 37 and 39 carried by stationary shaft 32 and the lower portion of the gyroscope housing. The gyroscope rotor is hollow, as can be seen by reference to Figure 1, and surrounds a member 38 which carries the stator windings 40 of an alternating current motor. The rotor windings or squirrel cage bars are indicated by the reference numeral 42. While I have shown an alternating curernt motor with the stator carried by the shaft 32 surrounded by a squirrel cage or rotor winding 42 for use with alternating current, it is to be understood that any suitable construction may be employed. The use of the rotor winding surrounding the stator will give a greater radius of gyration to the gyroscope rotor 36. The rotor 36 is bridged by a plate 44 formed with a shaft 46 which rotates in the ball bearing 39. The lower bearing also acts as a thrust bearing, the rotor being biased downwardly by a spring 48. The shaft 46 carries an insulating bushing 50 which supports a permanent magnet 52. A drag cup 54 formed of brass is mounted for rotation in a ball bearing 56 carried by the lower portion of the gyroscope housing 30. The drag cup is positioned spaced from but concentric with the permanent magnet 52, so that when eddy currents are generated in the drag cup by the rotation of magnet 52 with the gyroscope shaft 46, the drag cup will be rotated in the direction of rotation of the rotor.

A supporting plate 58 is carried by the lower portion of the gyroscope housing 30 by means of machine screws 60. A well member 62 is formed with a flattened central portion 64 formed by a curve of large radius and a marginal upwardly sloping portion 66, and is supported in the supporting plate 58. A sensing ball 68 is carried by the well. The supporting plate 58 also carries a hollow cylinder 70 formed with a series of teeth 72 with intermediate recesses 73 having inclined walls forming the sides of the teeth. A cage 74 is mounted for rotation within the cylinder 70 with bridge wall 76 normally adapted to engage the ball 68. The cage 74 carries four radially extending pins 78. The pins extend through a ring 80 to which is secured in any suitable manner a weight 82. A spiral drag spring 84 extends between a plate 83 carried by the housing and the upper surface of the pins 78.

The drag cup 54 is formed with a pair of wedges 90. The cage 74 is formed with a pair of lugs 92 which overlie the wedges 90, as can readily be seen by reference to Figure 2. The bridge wall 76 is formed with an opening 94 displaced from the center of the well 62 in a position such that when the ball is in alignment with the opening 94 the bridge wall will drop below the point of tangency on top of the ball 68 to a lower position due to the projection of a portion of the ball 68 through the opening 94.

In operation the energization of the stator winding 40 will cause the gyroscope rotor 36 to rotate. Rotation of the gyroscope and its lower shaft 46 rotate the permanent magnet 52 setting up eddy currents in the brass drag cup causing this to rotate with the rotating permanent magnet which carries its field around with it. The rotation of the drag cup in a clockwise direction, as viewed in Figure 2, will cause the wedges 90 carried by the drag cup to engage the lugs 92 carried by the cage 74. Since the cage is frequently biased by the spiral spring 84 against rotating, the cage will be stationary except at those moments when the wedges engage the lugs 92. At these moments the first movement of the cage is in the upward direction being cammed upwardly by the interaction of the wedges and the lugs. The upward motion is accompanied by a clockwise motion of the cage for a short space until the lugs 92 slip off the ends of the wedges 90. The action can be described as a periodic upward and rotary movement followed by a downward movement. The pins 78 being attached to the cage will move with the cage.

Figure 2:
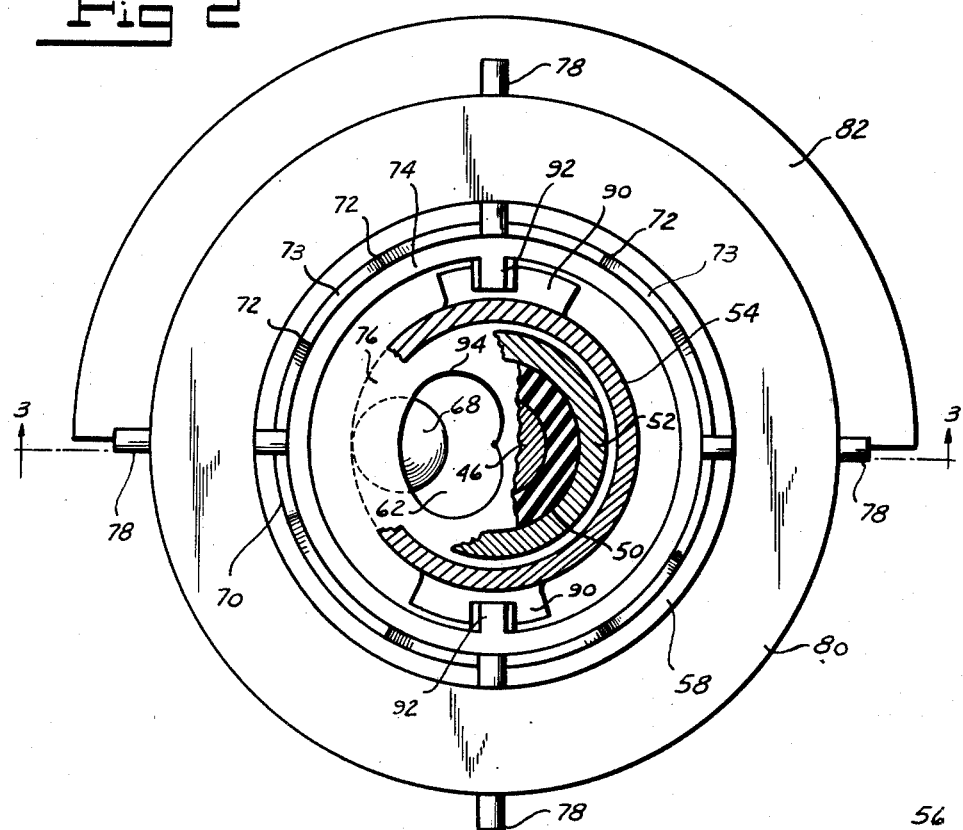
Figure 2 is a sectional view drawn on an enlarged scale taken along the line 2—2 of Figure 1.
Figure 3:
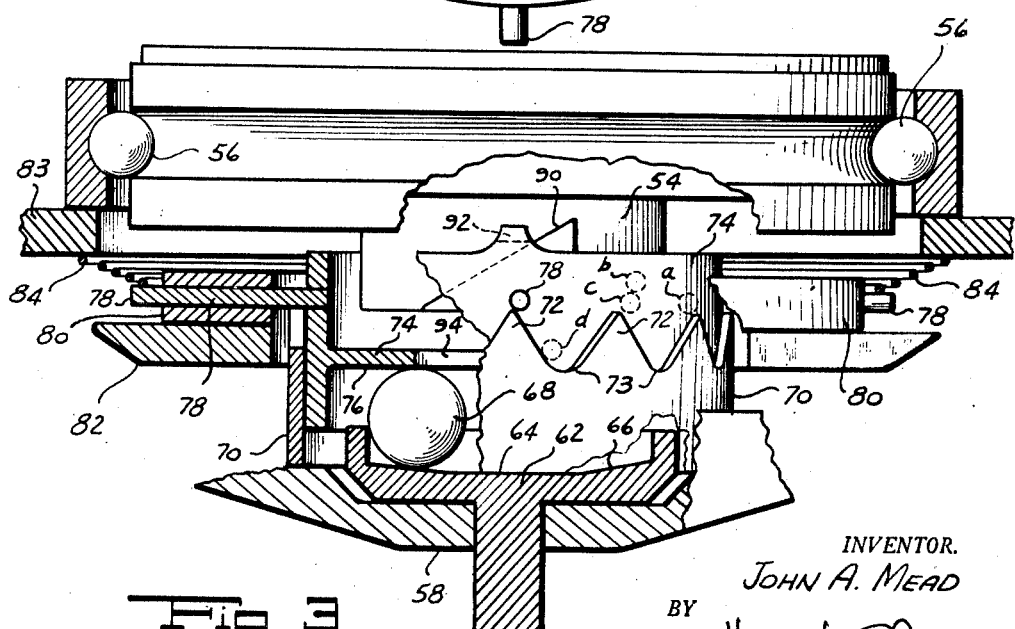
Figure 3 is a sectional view with parts not shown in section taken along the line 3—3 of Figure 2.

Referring now to Figure 3, the dotted line position a shows the end of a pin 78 at the moment the inclined surface of a wedge 90 engages a lug 92. The position b is the position occupied by a pin at the end of the upward and rotary movement of the cage. The position c is that occupied by the end of pin 78 when the lugs 92 slip off the ends of cams 90 and the bridge wall 76 engages the upper surface of the ball 68. The movement of the pins 78 will be accompanied by a corresponding movement of the ring 80 through which the pins pass and hence the eccentric weight 82 which is carried by the ring 80. In the position shown in Figure 2 with a gyroscope rotor rotating in a clockwise direction viewed in that figure, the position of the weight 82 will cause a torque in a clockwise direction, looking at the end of the right hand pin 78. The vertical spin axis of the gyroscope will move to align itself with the torque axis, that is, the upper portion of the spin axis will move to the right looking down at Figure 2, precessing the gyroscope housing around trunnions 18 and 20 in a clockwise direction viewed from trunnion 20. It will be observed that the opening 94 occupies a predetermined position with respect to the eccentric weight 82 and that the eccentric weight is exactly 90° from the opening 94. In this manner the torque is applied along an axis passing through the plane of tilt and in such a manner that the precession of the spin axis will remove the tilt. The motion just described, whereby the eccentric weight 82 is stepped around intermittently, continues. Assuming that the gyroscope remains substantially vertical, the spin axis will describe a small circle precessing constantly depending on the position of the eccentric weight. If this small circle is of negligible radius the spin axis may be considered as being maintained in the erect position.

Let us now suppose that the upper portion of the spin axis of the gyroscope becomes inclined forwardly, that is, toward the upper portion of the sheet, as viewed in Figure 2, during the moment when the cams 90 move the cage so the pins are at position b in Figure 3, the ball will roll downwardly along the well and be positioned toward the region of the upper prong 92 in Figure 2. When the opening 94 moves over the ball area, the cage will drop so that the pins 78 will occupy the position shown by the dotted line circle indicated by the reference numeral d in Figure 3. This will cause the eccentric weight which will now be to the right hand side of Figure 2 to dwell during the period while the cam raises the cage from the position d to the height of the dotted circle b. This interrupts the intermittent motion of the cage for a period of time during which there will be a torque applied by the weight in a clockwise direction viewed along the end of the lower pin 78 in Figure 2. This torque will cause the gyroscope to precess in a clockwise direction viewed from the end of the left hand pin 78 in Figure 2, thus bringing the gyroscope to its erect position. When the cage is again lifted, the ball will roll to the center of the well and permit the periodic rotation of the eccentric weight at a uniform rate.

It will be recalled that the marginal area of the well member 62 is formed with an inclined surface 66. This inclined surface is at a slight angle, say 4° with the horizontal and stops the ball in the region of the locus of the opening 94 so that the erecting action just described may ensue. During a turn of the aircraft it is desirable to render the erecting system inoperative for the moment in order to avoid the introduction of errors. The centrifugal force occasioned by the turn will lodge the ball in the position it occupies in Figures 2 and 3, that is, at the extreme periphery of the well member, and in this position the ball projects under the bridge wall 76 clear of the opening 94, so that the bridge wall will support the searching cage clear of the teeth of the hollow cylinder member 70 in which the cage rotates. As soon as the turn is completed, the ball is permitted to roll by gravity to the position it normally occupies by the tilt of the gyroscope spin axis, and the erecting action described will again take place. It will be observed that during the turn the ball itself will introduce a slight torque. In a typical case I may use a ball three-sixteenths of an inch in diameter with a rotor rotating at twenty-two thousand revolutions per minute. Under these conditions the precessing during the turn caused by the weight of the ball would be measured in hundredths of a degree per minute and is negligible.

It will be seen that I have accomplished the objects of my invention. I have provided a rolling ball erecting system permitting substantially straight line erection of a gyroscope, which gyroscope is balanced and not pendulous. I have provided a searching cage erection system in which a rolling ball is employed as the sensing member, in which the erection system is rendered inoperative during turns automatically, and in which a minimum of error is introduced during turns. In my searching cage erection system the point at which the erecting torque is applied is controlled even though I employ a rolling ball as the sensing member. My erection system is small, compact, and does not add much weight to the assembly.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A gyroscope including in combination a gyroscope housing, means for mounting the housing for rotary movement about a pair of axes disposed at right angles to each other, a rotor positioned in the housing for spin about a substantially vertical axis, means for driving the rotor, a cam, means for mounting the cam for rotation about a vertical axis, means for rotating the cam from the rotor, a follower, means for mounting the follower for rotation about a vertical axis, said cam being positioned and arranged to reciprocate and to rotate the follower stepwise at a predetermined integral rate, said follower being formed with an eccentrically positioned opening, a precessing mass carried by the follower and disposed with its center of gravity along an axis positioned at right angles from the axis of eccentricity of the opening, a well carried by the housing, a ball positioned in the well and normally adapted to limit the downward movement of the follower, coacting means carried by the follower and the housing for causing the follower to dwell when the ball is in alignment with the opening to permit the follower to move to a lower position.

2. A gyroscope erection system including in combination a gyroscope having a housing, a rotary member carried by the gyroscope housing, an independently rotatable eccentrically positioned mass carried by the housing adapted to exercise an erection torque upon the gyroscope, coacting means carried by the rotary member and the eccentrically positioned mass for intermittently rotating the eccentrically positioned mass at a substantially uniform integral rate, a ball-supporting surface perpendicular to the spin axis of the gyroscope, a sensing ball carried by said surface, and means for causing said mass to dwell along a line substantially at right angles to a line joining the spin axis of the gyroscope and the ball whenever the gyroscope spin axis departs from the vertical direction.

3. A gyroscope erection system as in claim 2 in which said rotary member comprises a cam and means for rotating the cam from the gyroscope rotor.

4. A gyroscope erection system as in claim 2 in which said rotary member comprises a cam, means for mounting said cam for rotation about a vertical axis, a drag cup carried by said cam, and means for rotating said drag cup from the gyroscope rotor.

5. A gyroscope erection system as in claim 2 in which said eccentrically positioned mass includes a follower, and said coacting means includes a cam member adapted to interact with said follower to reciprocate and rotate the same stepwise at a uniform integral rate.

6. A gyroscope erection system as in claim 2 in which said rotary member comprises a cam and said eccentrically positioned mass includes a follower formed with an eccentrically positioned opening, and said means for causing the eccentric mass to dwell comprises a well formed with said surface, said ball positioned in said well and adapted to extend through said follower opening when the spin axis of the gyroscope departs from the vertical position.

7. A gyroscope including in combination a gyroscope housing, a rotor positioned in the housing for spin about a substantially vertical axis, a rotary cam, a follower, said cam being positioned and arranged to reciprocate and rotate the follower at a substantially uniform overall rate when the gyroscope spin axis is substantially in a vertical position, the follower being formed with an eccentrically positioned opening, a precessing mass carried by the follower and disposed with its center of gravity along an axis positioned at right angles from the axis of eccentricity of the opening, a ball carried by the housing below the follower and normally adapted to limit its movement in a downward direction, and means for causing the follower to dwell when the ball is in alignment with the follower opening permitting the follower to move to a lower position with the ball extending through the follower opening.

8. A gyroscope as in claim 7 including in combination a well, means for supporting said well from said housing, the ball being positioned in said well, said well having a surface centrally thereof extending in a horizontal plane when the gyro spin axis is in a vertical position, and a peripheral portion lying along an inclined plane adapted to direct the ball toward the central portion.

9. A gyroscope as in claim 7 including in combination a well member formed with a central depressed portion carried by said housing, said ball being positioned in said well member and a peripheral stop for said well member positioned to limit the motion of the ball in a position beyond said opening when said ball is thrown out by centrifugal force whereby to render the erecting action inoperative whenever the ball is under the influence of centrifugal force.

10. A gyroscope as in claim 7 in which said means for causing the follower to dwell includes coacting means carried by said follower and the housing, the coacting means adapted to engage whenever the ball extends partially through said opening.

11. A gyroscope as in claim 7 in which said rotary cam is formed with a drag cup, and magnetic means carried by the gyroscope rotor for rotating said drag cup.

JOHN A. MEAD.

REFERENCES CITED

The following references are of record in the file of this patent:

UNITED STATES PATENTS

| Number | Name | Date |
|---|---|---|
| 2,348,604 | Carlson | May 9, 1944 |
| 2,408,411 | Curry, Jr. | Oct. 1, 1946 |
| 2,480,263 | Raspet | Aug. 30, 1949 |